United States Patent [19]

Trantham

[11] Patent Number: 4,709,321
[45] Date of Patent: Nov. 24, 1987

[54] REGULATOR PROTECTION CIRCUIT FOR VIDEO APPARATUS

[75] Inventor: Dana C. Trantham, Indianapolis, Ind.

[73] Assignee: RCA Corporation, Princeton, N.J.

[21] Appl. No.: 926,032

[22] Filed: Oct. 31, 1986

[51] Int. Cl.$^4$ ............................................. H02H 7/122
[52] U.S. Cl. ..................................... 363/56; 315/411; 363/21
[58] Field of Search .......................... 363/21, 49, 56; 358/190; 315/411; 361/92

[56] References Cited

U.S. PATENT DOCUMENTS

| | | | |
|---|---|---|---|
| 4,074,323 | 2/1978 | Griffey | 315/411 |
| 4,188,568 | 2/1980 | Manners | 315/411 |
| 4,288,831 | 9/1981 | Dolikian | 361/92 |
| 4,447,841 | 5/1984 | Kent | 361/92 |
| 4,516,168 | 5/1985 | Hicks | 363/56 |

OTHER PUBLICATIONS

Daugschat, "A Power Supply with Cut-Out (Translated)", Toute l'Electronique, (France), No. 407, pp. 60-65, Feb. 76.

Wilkinson, "Color TV Receiver Design", Wireless Word, vol. 86, No. 1538, pp. 87, 88, Nov. 1980.

*Primary Examiner*—William H. Beha, Jr.
*Attorney, Agent, or Firm*—Paul J. Rasmussen; Joseph J. Laks; Scott J. Stevens

[57] ABSTRACT

A power supply for a video apparatus includes a transformer incorporating windings that supply power to load circuits. A primary side winding provides power to the power supply regulator circuit. In the event a fault occurs in one of the load circuits and insufficient voltage is developed to power the regulator control circuitry, a protection circuit disables the regulator control circuitry in order to prevent damage to the power supply regulator switching transistor. The protection circuit operates within a wide range of input voltage with little power dissipation.

5 Claims, 1 Drawing Figure

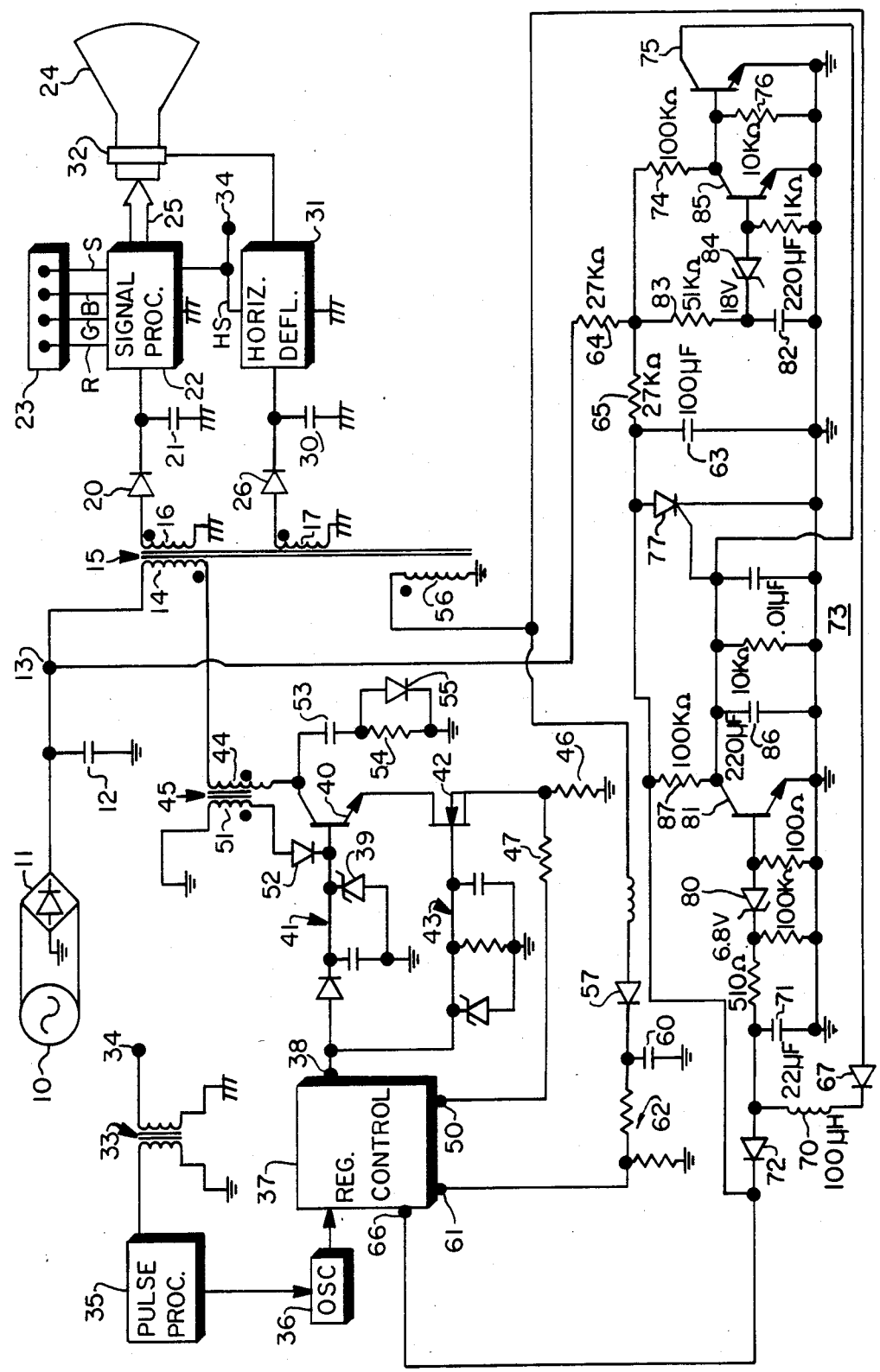

REGULATOR PROTECTION CIRCUIT FOR VIDEO APPARATUS

This invention relates to video apparatus and, in particular, to protection circuitry for video apparatus having a switching-type power supply regulator.

Video apparatus, such as television receivers and computer monitors, for example, incorporate power supplies that produce one or more regulated voltage levels for powering various load circuits. These load circuits are typically incorporated within the video apparatus, but may be peripheral or external devices. The degree of regulation of the load circuit supply voltages that is required may be quite severe, particularly in the case of computer monitors. Computer monitors, and television receivers that include provisions for direct video and audio input and output through user accessible terminals also require some means for electrically isolating those input and output terminals from the AC power line. Electrical isolation may be effectively and economically accomplished by electrically isolating the AC line-connected primary winding of a power supply transformer from the user accessible load circuit-connected secondary windings. The conduction current in the primary winding is switched to effect regulation of the secondary winding-developed load circuit voltage supplies. With the power transformer being the isolating structure, it is not economical to couple a feedback signal from one of the secondary winding-connected load circuits to primary winding-connected regulating circuitry. In order to avoid the added cost and complexity of a feedback isolation device or structure, it is desirable to provide load circuit supply regulation via feedback from the primary winding side of the power transformer. Primary side regulation, however, may make detection of load circuit faults or malfunctions more difficult than when load circuit feedback regulation arrangements are utilized. The result may be that some load circuit faults, such as short circuit overload conditions, may cause damage to the regulator, which attempts to continue regulation even in the presence of the fault condition. It is desirable, therefore, to provide some means for detecting certain load circuit fault conditions and disabling the power supply regulator in response to those conditions in order to prevent damage to the regulator.

In accordance with an aspect of the present invention, a power supply for a video apparatus comprises a source of unregulated voltage, a first winding coupled to and electrically nonisolated from the voltage source, a second winding isolated from the first winding, and a third winding electrically nonisolated from the first winding. A load circuit, which is subject to a fault condition, is connected to and powered from the second winding. Regulator circuitry periodically energizes the first winding from the unregulated voltage source, causing voltages to be developed across the second winding for powering the load circuit, and across the third winding. The third winding voltage is above a predetermined level in the absence of the fault condition and below the predetermined level during the occurrence of the fault condition. A protection circuit includes a switch that, when rendered conductive, disables the regulator. Circuitry responsive to the voltage developed across the third winding maintains the switch nonconductive when the voltage is above the predetermined level, and renders the switch conductive when the voltage is below the predetermined level.

In the accompanying drawing, the sole FIGURE is a block and schematic diagram of a portion of a video apparatus incorporating a power supply in accordance with an aspect of the present invention.

Referring to the FIGURE, there is shown a video apparatus, such as a television receiver or computer monitor, for example, in which a source of AC voltage 10, such as an AC line supply, is rectified by circuitry 11 and filtered by capacitor 12 to form a source of unregulated DC voltage at a terminal 13. The unregulated DC voltage is applied to one terminal of a primary winding 14 of a power transformer 15. Current flow from the unregulated DC voltage source at terminal 13 through primary winding 14 causes current to flow and voltages to be developed across secondary windings 16 and 17 by transformer action.

The voltage developed across winding 16 is rectified by diode 20 and filtered by capacitor 21 to form a DC supply voltage that illustratively provides power to signal processing circuitry 22. Signal processing circuit 22 illustratively receive red, green, and blue (R, G, B) designated video signals, along with a synchronizing signal (S), via a user accessible terminal 23, from an external signal source (not shown), such as a computer. Signal processing circuit 22 produces the red, green, and blue color drive signals which are applied to the electron gun assembly (not shown) of a cathode ray tube (CRT) 24 via a conductor 25.

The voltage developed across winding 17 is rectified by a diode 26 and filtered by a capacitor 30 to form a DC supply voltage that is illustratively used to power a horizontal deflection circuit 31. Horizontal deflection circuit 31 produces a deflection signal that is applied to and produces a deflection current in a horizontal deflection winding, which forms part of a deflection yoke 32, located on the neck of CRT 24. Horizontal deflection circuit 31 is synchronized in operation by an appropriate horizontal or line rate synchronizing signal provided by signal processing circuit 22 via a conductor HS.

Transformer 15 provides electrical isolation between the line supply AC voltage source 10 and the secondary-connected user accessible load circuits, indicated by the use of different ground symbols in the FIGURE.

The general operation of the power supply will now be described. The horizontal of line rate synchronizing signal on conductor HS is also applied to transformer 33 via a terminal 34. Transformer 33 provides electrical isolation between the signal processing load circuit 22 and any AC voltage source-connected circuitry. The horizontal synchronizing signal is reflected through transformer 33 and is applied to a pulse processing circuit 35 which generates a square wave signal at the incoming synchronizing rate, illustratively of the order of 64 kHz. This square wave signal is applied to oscillator 36 in order to lock the frequency of its operation. The output of oscillator 36 is applied to regulator control circuit 37, which operates as a pulse width modulator. The output of regulator control circuit 37 at teminal 38 is a pulse width modulated switching signal that is applied to the base of a transistor 40 via a noise suppression and voltage clamp circuit 41, and to the gate of a field effect transistor (FET) 42 via a noise suppression and clamp circuit 43. Transistor 40 and FET 42 are connected in a cascode configuration. FET 42 switches conductive states in response to switching pulses from regulator control circuit 37 faster than transistor 40.

Conduction of FET 42 will therefore aid in turning transistor 40 on and off by pulling the emitter of transistor 40 low to turn transistor 40 on and opening the emitter of transistor 40 to turn transistor 40 off. When transistor 40 is conducting, current flows from the unregulated DC source at terminal 13 through primary winding 14, winding 44 of a transformer 45, the collector-emitter path of transistor 40, the drain-source path of FET 43 and resistor 46 to ground. Resistor 46 and resistor 47 form a voltage divider that provides a feedback signal, indicative of conduction current flow, to terminal 50 of regulator control circuit 37 in order to provide current mode control of regulator control circuit 37. Secondary winding 51 of transformer 45 provides regenerative base current via diode 52 for transistor 40 in order to quickly saturate transistor 40 and maintain it in saturation to reduce power dissipation. Capacitor 53, resistor 54 and diode 55 form a snubber circuit to absorb excess engergy when transistor 40 is rendered nonconductive in order to reduce the voltage level applied to transistor 40. Zener diode 39 also becomes conductive to remove base charge from transistor 40 when transistor 40 is rendered nonconductive.

The voltage levels of the DC voltage applied to signal processing circuit 22 and horizontal deflection circuit 31 are regulated by controlling the duty cycle of the output switching pulses of regulator control circuit 37, which in turn determines the conduction interval of transistor 40 and hence the current flow interval through primary winding 14. In order to avoid the cost and complexity of an additional isolating component, such as a transformer or an optocoupler, from the secondary circuits to regulator control circuit 37, feedback information to regulator control circuit 37 is provided from the primary winding side of transformer 15, by way of winding 56, which is electrically nonisolated from primary winding 14. The voltage developed across winding 56 is rectified by diode 57 and filtered by capacitor 60 to form a voltage that is applied to terminal 61 of regulator control circuit 37 via voltage divider 62. Regulator contol circuit 37 therefore receives current mode feedback information via input terminal 50 and voltage feedback information via input terminal 61. The output at terminal 38 therefore comprises a switching signal having pulses modulated in accordance with the feedback information in order to accurately regulate the secondary developed load circuit supply voltages.

When the video apparatus is initially energized, current from the unregulated DC supply at terminal 13 begins to charge capacitor 63 through current limiting resistors 64 and 65. Capacitor 63 is coupled to the power supply input terminal 66 of regulator control circuit 37. When the voltage across capacitor 63 reaches approximately 16 volts, regulator control circuit 37 begins to operate, generating a series of output switching pulses for FET 42 and transistor 40, and discharging capacitor 63 since the energy requirement of regulator control circuit 37 is greater than that which can be supplied via the network comprising resistors 64 and 65, and capacitor 63. Under normal operating conditions, the load circuit supply voltages and the voltage across winding 56 becomes established quickly. The voltage developed across winding 56 causes current to flow through diode 67 and inductor 70, charging capacitor 71. The voltages across capacitors 63 and 71 provide the normal operating supply voltage and current for regulator control circuit 37 via diode 72.

If an abnormal operating condition should exist, such as a short circuit in one of the load circuits, the energy that is stored in flyback-type transformer 15 will be insufficient to permit significant voltage levels to be established across the secondary windings or across winding 56. Capacitor 71 will be unable to charge to a level sufficient to supply normal operating current for regulator control circuit 37. Capacitor 63 continues to discharge, until the voltage across capacitor 63 reaches a level at which regulator control circuit is no longer operative, illustratively of the order of 10 volts. Regulator control circuit 37 then ceases to generate switching pulses, allowing capacitor 63 to recharge. When the voltage across capacitor 63 again reaches a level of the order of 16 volts, regulator control circuit again begins to operate, generating switching pulses. It is understood that the previously described cycle comprising the charging capacitor 63, followed by the generation of switching pulses while discharging capacitor 63, and the recharging of capacitor 63 with the subsequent generation of more switching pulses should occur only in the presence of an abnormal condition of one of the load circuits. Absent such an abnormal condition, normal operation of the power supply is achieved quickly, often during the first series of switching pulses. When an abnormal condition is or becomes present, however, the described start-up cycling procedure occurs. This start-up cycling may occur during energization of the video apparatus if the abnormal condition is initially present, or it may occur after a period of normal operation if such an abnormal condition should suddenly occur.

The switching pulses produced by regulator control circuit 37 are by themselves unable to drive transistor 40 into saturation. Additional base current for transistor 40, provided via winding 51 of transformer 45 during normal power supply operation, is required to saturate transistor 40. During the start-up cycling procedure previously described, therefore, transistor 40 will not become saturated, but will instead operate in its linear region, dissipating a large amount of power. Extended start-up cycling that may occur if a load circuit shorts or other abnormal operating condition should exist may lead to thermal damage or destruction of transistor 40 and/or other components of the power supply.

In accordance with an aspect of the present invention, a protection circuit 73 disables regulator control circuit 37 if a sufficient voltage to provide normal operation is not established across winding 56 in a reasonable time. When power is first applied to the video apparatus, current flows from the quickly established unregulated voltage supply at terminal 13 through resistor 64 turning transistor 75 on quickly via bias resistors 74 and 76. Conduction of transistor 75 pulls the gate of SCR 77 low, such that SCR 77 is maintained nonconductive. As the power supply achieves normal operation, capacitor 71 becomes charged in order to supply normal operating voltage and current to regulator control circuit 37. During normal operation, the voltage across capacitor 71 is sufficient to cause Zener diode 80 to avalanche, thereby rendering transistor 81 conductive. Conduction of transistor 81 also pulls the gate of SCR 77 low, maintaining SCR 77 nonconductive. After a period of time greater than that required for transistor 81 to be rendered conductive, capacitor 82 will become charged via resistor 64 and resistor 83 sufficient to cause zener diode 84 to avalanche, thereby rendering transistor 85 conductive. Conduction of transistor 85 will cause the base of transistor 75 to be pulled low, thereby turning transistor 75 off and rendering it nonconductive. SCR 77 will remain nonconductive since transistor 81 is conductive and holding the gate of SCR 77 low.

In the presence of an abnormal operating condition in one of the load circuits, such as a short circuit, for example, capacitor 71 will fail to charge or will become discharged below a level sufficient to cause Zener diode 80 to avalanche. Base current will no longer be supplied to transistor 81, and consequently transistor 81 will become nonconductive. Capacitor 86 will charge via resistor 87, raising the gate voltage of SCR 77 to a level sufficient to cause SCR 77 to become conductive. The conduction of SCR 77 essentially grounds the power supply input terminal 66 of regulator control circuit 37, thereby disabling the power supply and protecting the switching transistor 40 from damage due to extended start-up cycling. The time constant defined by resistor 87 and capacitor 86 prevents nuisance tripping of SCR 77 due to noise or transient losses in operating voltage. Reset of the protection circuit 73 requires removal of power from the video apparatus for a period of time sufficient to allow the associated circuit capacitors to discharge, of the order of two minutes, for example.

The protection circuit described is suitable for video apparatus operating a various AC line voltage, including extended range video apparatus that may operate at any input voltage between 90–250 volts, for example, and dissipates very little power, of the order of less than 1 watt. The protection circuit includes circuitry that immediately renders the power supply disabling mechanism nonresponsive for a period of time to allow the power supply to begin operating normally. At that time, circuitry responsive to the operating voltage or the voltage developed across the power supply transformer winding becomes operative. After the normal protective circuitry is operative, the initial disabling mechanism hold-off circuitry becomes inoperative.

What is claimed is:

1. A power supply for a video apparatus comprising:
   a source of unregulated voltage;
   a transformer comprising:
     a first winding coupled to said source of unregulated voltage for being energized therefrom;
     a second winding electrically isolated from said first winding and disposed to being energized from said first winding for providing power to a load circuit; and
     a third winding electrically nonisolated from said first winding and disposed for being energized from said first winding;
   regulator means coupled to said third winding for receiving a first amount of power therefrom, said regulator means controlling the energization of said first winding when said regulator means operates in a normal mode of operation;
   means for coupling said source of unregulated voltage to said regulator means for supplying a second amount of power thereto, the combination of said first and said second amonts of power causing said regulator means to operate in said normal mode of operation, the operation of said regulator means in the absence of said first amount of power causing damage to said regulator means after a first time interval; and
   protection means for disabling said regulator means after a second time interval less than said first time interval when said regulator means is operating in the absence of said first amount of power.

2. A power supply for a video apparatus comprising:
   a source of unregulated voltage;
   a first winding coupled to said source of unregulated voltage and electrically nonisolated therefrom;
   a second winding electrically isolated from said first winding; and
   a third winding electrically nonisolated from said first winding;
   a load circuit coupled to said second winding for being powered therefrom, said load circuit subject to a fault condition;
   regulator means coupled to said first winding for periodically energizing said first winding from said source of unregulated voltage, said periodic energization causing a voltage to be developed across said second winding for powering said load circuit and causing a voltage to be developed across said third winding, said voltage developed across said third winding being above a predetermined level in the absence of said fault condition and below said predetermined level during the occurrence of said fault condition; and
   protection means coupled to said regulator comprising:
   a switch for disabling said regulator when rendered conductive; and
   means responsive to said voltage developed across said third winding for maintaining said switch nonconductive when said voltage developed across said third winding is above said predetermined level and rendering said switch conductive when said voltage developed across said third winding is below said predetermined level, wherein said third winding is coupled to said regulator means for providing power thereto.

3. A power supply for a video apparatus comprising:
   a source of unregulated voltage;
   a first winding coupled to said source of unregulated voltage and electrically nonisolated therefrom;
   a second winding electrically isolated from said first winding; and
   a third winding electrically nonisolated from said first winding;
   a load circuit coupled to said second winding for being powered therefrom, said load circuit subject to a fault condition;
   regulator means coupled to said first winding for periodically energizing said first winding from said source of unregulated voltage, said periodic energization causing a voltage to be developed across said second winding for powering said load circuit and causing a voltage to be developed across said third winding, said voltage developed across said third winding being above a predetermined level in the absence of said fault condition and below said predetermined level during the occurrence of said fault condition; and
   protection means coupled to said regulator comprising:
   a switch for disabling said regulator when rendered conductive; and
   means responsive to said voltage developed across said third winding for maintaining said switch nonconductive when said voltage developed across said third winding is above said predetermined level and rendering said switch conductive when said voltage developed across said third winding is below said predetermined level, wherein said third winding is coupled to said regulator means for providing power thereto, and wherein said power provided to said regulator means is insufficient to power said regulator means during the occurrence of said fault condition.

4. A power supply for a video apparatus comprising:
a source of unregulated voltage;
a first winding coupled to said source of unregulated voltage and electrically nonisolated therefrom;
a second winding electrically isolated from said first winding; and
a third winding electrically nonisolated from said first winding;
a load circuit coupled to said second winding for being powered therefrom, said load circuit subject to a fault condition;
regulator means coupled to said first winding for periodically energizing said first winding from said source of unregulated voltage, said periodic energization causing a voltage to be developed across said second winding for powering said load circuit and causing a voltage to be developed across said third winding, said voltage developed across said third winding being above a predetermined level in the absence of said fault condition and below said predetermined level during the occurrence of said fault condition; and
protection means coupled to said regulator comprising:
a switch for disabling said regulator when rendered conductive; and
means responsive to said voltage developed across said third winding for maintaining said switch nonconductive when said voltage developed across said third winding is above said predetermined level and rendering said switch conductive when said voltage developed across said third winding is below said predetermined level, wherein said third winding is coupled to said regulator means for providing power thereto, and wherein said third winding is coupled to said regulator means for providing a feedback signal thereto for regulating said voltage developed across said second winding.

5. A power supply for a video apparatus comprising:
a source of unregulated voltage;
a transformer comprising:
a first winding coupled to said source of unregulated voltage and electrically nonisolated therefrom;
a second winding electrically isolated from said first winding; and
a third winding electrically nonisolated from said first winding;
a load circuit coupled to said second winding for being powered therefrom, said load circuit subject to a fault condition;
regulator means coupled to said first winding for periodically energizing said first winding from said source of unregulated voltage, said periodic energization causing a voltage to be developed across said second winding for powering said load circuit and causing a voltage to be developed across said third winding, said voltage developed across said third winding being above a predetermined level in the absence of said fault condition and below said predetermined level during the occurrence of said fault condition; said third winding coupled to said regulator means for providing power to said regulator means, said power provided by said third winding being insufficient to power said regulator means in the presence of said fault condition; and
protection means coupled to said regulator comprising:
a switch for disabling said regulator when rendered conductive;
first means for maintaining said switch nonconductive during a first interval;
second means, becoming responsive to said voltge developed across said third winding after a second interval less than said first interval for maintaining said switch nonconductive when said voltage developed across said third winding is above said predetermined level and rendering said switch conductive when said voltage developed across said third winding is below said predetermined level; and
means for disabling said first means after said first interval.

* * * * *